United States Patent
Okubi

(10) Patent No.: US 11,301,699 B2
(45) Date of Patent: Apr. 12, 2022

(54) IMAGE PROCESSING SYSTEM, PROCESSING DEVICE, RELAY DEVICE, AND RECORDING MEDIUM STORING PROGRAM

(71) Applicant: TOYOTA JIDOSHA KABUSHIKI KAISHA, Toyota (JP)

(72) Inventor: Ryota Okubi, Funabashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/096,240

(22) Filed: Nov. 12, 2020

(65) Prior Publication Data

US 2021/0150229 A1   May 20, 2021

(30) Foreign Application Priority Data

Nov. 19, 2019   (JP) .............................. JP2019-208883

(51) Int. Cl.
| | |
|---|---|
| *G06K 9/00* | (2006.01) |
| *G06K 9/68* | (2006.01) |
| *H04N 7/025* | (2006.01) |
| *G06K 9/62* | (2022.01) |
| *H04N 5/232* | (2006.01) |
| *H04B 7/15* | (2006.01) |
| *G06K 9/03* | (2006.01) |
| *H04L 67/12* | (2022.01) |
| *G08G 1/16* | (2006.01) |

(52) U.S. Cl.
CPC ......... *G06K 9/00805* (2013.01); *G06K 9/036* (2013.01); *G06K 9/6215* (2013.01); *G08G 1/164* (2013.01); *H04B 7/15* (2013.01); *H04L 67/12* (2013.01); *H04N 5/23229* (2013.01); *H04N 7/025* (2013.01)

(58) Field of Classification Search
None
See application file for complete search history.

(56) References Cited

U.S. PATENT DOCUMENTS

| | | | |
|---|---|---|---|
| 2016/0217333 A1* | 7/2016 | Ozawa | ................... G08G 1/164 |
| 2017/0278321 A1 | 9/2017 | Nishida et al. | |
| 2020/0109954 A1* | 4/2020 | Li | ........................ G05D 1/0274 |

FOREIGN PATENT DOCUMENTS

JP   2017-174244 A   9/2017

* cited by examiner

*Primary Examiner* — Samuel D Fereja

(74) *Attorney, Agent, or Firm* — Sughrue Mion, PLLC

(57) ABSTRACT

An image processing system includes an image capture device provided in a vehicle, a control device installed in the vehicle, and a processing device that performs image processing. The control device includes a first processor that transmits a captured image captured by the image capture device as image information from the vehicle. The processing device includes a second processor, and the second processor receives image information transmitted from a plurality of the vehicles, calculate a degree of similarity of a captured image according to newly-received image information relative to a reference image according to previously-received image information, and performs image processing to identify an obstacle with respect to a captured image having a degree of similarity that is lower than a threshold value.

11 Claims, 13 Drawing Sheets

IMAGE PROCESSING SYSTEM, PROCESSING DEVICE, RELAY DEVICE, AND RECORDING MEDIUM STORING PROGRAM

CROSS-REFERENCE TO RELATED APPLICATION

This application is based on and claims priority under 35 USC 119 from Japanese Patent Application No. 2019-208883 filed on Nov. 19, 2019, the disclosure of which is incorporated by reference herein.

BACKGROUND

Technical Field

The present disclosure relates to an image processing system that processes an image, a processing device, a relay device, and a recording medium storing a program.

Related Art

Japanese Patent Application Laid-open No. 2017-174244 discloses an information processing device intended to provide appropriate information to a vehicle that is a connected car, which is controlled based on recognition results obtained by external world recognition means.

Here, when image processing is performed on a captured image captured by a vehicle in the information processing apparatus disclosed in Japanese Patent Laid-Open No. 2017-174244 in order to identify a road obstacle, when image processing is performed in the information processing apparatus on all captured images transmitted from the vehicle side, the load at the side of the information processing apparatus is increased.

SUMMARY

The present disclosure aims to provide an image processing system, a processing device, a relay device, and a recording medium storing a program, that can reduce the number of captured images to be processed by the processing-side device, and can reduce the processing load, when performing image processing for identifying an obstacle based on an image captured by a vehicle.

A first aspect is an image processing system that includes an image capture device provided in a vehicle, a transmission unit, a receiver unit, a calculation unit, and a processing unit. The transmission unit transmits, from the vehicle, a captured image captured by the image capture device as image information. The receiver unit receives image information transmitted from a plurality of the vehicles. The calculation unit calculates a degree of similarity between a captured image according to newly received image information, and a reference image according to image information that has already been received. The processing unit performs image processing to identify an obstacle with respect to a captured image having a degree of similarity that is lower than a threshold value.

In the image processing system according to the first aspect, an image capture device and a transmission unit are provided in a vehicle, a receiver unit in a device outside the vehicle receives image information from a plurality of vehicles, a calculation unit calculates a degree of similarity between captured images, and a processing unit executes the image processing on a captured image having a degree of similarity degree that is lower than a threshold value.

Here, the degree of similarity of the captured image is calculated as a value with respect to a reference image that has already been received. In the image processing system, the configuration is such that a captured image having a degree of similarity that is equal to or higher than the threshold value is treated as an image that is similar to the reference image, and image processing is not executed. As a result, when performing image processing to identify an obstacle based on images captured at a vehicle, it is possible to reduce the number of captured images that are to be processed by the device that performs the image processing and the processing load can be reduced.

An image processing system according to a second aspect is the image processing system according to the first aspect, in which the receiver unit receives, together with the image information, first position information attached to the captured image and second position information on another vehicle, and further includes a determination unit and a notification unit. The determination unit determines whether or not the other vehicle having the second position information has approached the obstacle corresponding to the first position information. The notification unit notifies the other vehicle of the danger information in a case in which the determination unit determines that the other vehicle has approached the obstacle.

In the image processing system of the second aspect, the receiver unit receives the first position information of the captured image and the second position information of the other vehicle, and the determining unit determines whether the other vehicle has approached the Obstacle. In a case in which it is determined that the other vehicle has approached the obstacle, the notification unit notifies the other vehicle of the danger information. According to this image processing system, it is possible to alert another vehicle to an obstacle on the road based on the first position information of the obstacle.

An image processing system according to a third aspect is the image processing system according to the first or second aspect, including a control device, a relay device, and a processing device. The control device is installed at the vehicle having the transmission unit. The relay device includes the receiver unit, which receives image information transmitted from a plurality of the control devices, and the calculation unit, and transmits image information according to a degree of similarity that is lower than the threshold value. The processing device receives the image information transmitted from the relay device and includes the processing unit.

The image processing system according to the third aspect includes a control device installed at a vehicle, a processing device that executes image processing, and a relay device that performs relay between the control device and the processing device. According to this image processing system, since the relay device selects a captured image to be transmitted to the processing device based on the degree of similarity, it is possible to reduce the amount of communication in the communication line between the relay device and the processing device.

An image processing system according to a fourth aspect is the image processing system according to the third aspect, in which the relay device transmits image information according to a degree of similarity that is lower than the threshold value to the processing device and to discard image information according to a degree of similarity that is equal to or higher than the threshold value.

According to the image processing system of the fourth aspect, since an image that is deemed similar to the reference image is not stored in the relay device, resource consumption of the relay device can be suppressed.

A fifth aspect is a processing device that includes a receiver unit, a calculation unit, and a processing unit. The receiver unit receives, from a vehicle, image information according to a captured image captured by an image capture device provided at the vehicle. The calculation unit calculates a degree of similarity between a captured image according to newly received image information, and a reference image according to image information that has already been received. The processing unit performs image processing to identify an obstacle with respect to a captured image having a degree of similarity that is lower than a threshold value.

In the processing device according to the fifth aspect, the receiver unit receives the image information from a plurality of vehicles, the calculation unit calculates the degree of similarity of captured images, and the processing unit executes image processing on a captured image having a degree of similarity that is lower than a threshold value. As described above, the degree of similarity of the captured image is calculated as a value with respect to a reference image that has already been received. In the processing device, the configuration is such that a captured image having a degree of similarity that is equal to or higher than the threshold value is treated as an image that is similar to the reference image, and image processing is not executed. As a result, when performing image processing to identify an obstacle based on images captured at a vehicle, it is possible to reduce the number of captured images that are to be processed by the processing device and the processing load can be reduced.

A sixth aspect is a relay device that includes a receiver unit, a calculation unit, and a transmission unit. The receiver unit receives, from a vehicle, image information according to a captured image captured by an image capture device provided at the vehicle. The calculation unit calculates a degree of similarity between a captured image according to newly received image information, and a reference image according to image information that has already been received. The transmission unit transmits image information according to a degree of similarity that is lower than a threshold value to a processing device that performs image processing to identify an obstacle.

The relay device of the sixth aspect is a device that performs relay between a vehicle having an image capture device and a processing device that performs image processing to identify an obstacle. In the relay device, the receiver unit receives image information from a plurality of vehicles, the calculation unit calculates the degree of similarity of captured images, and the transmission unit transmits a captured image having a lower degree of similarity than a threshold value to the processing device. As described above, the degree of similarity of the captured image is calculated as a value with respect to a reference image that has already been received. According to this relay device, when performing image processing to identify an obstacle based on images captured at a vehicle, it is possible to reduce the number of captured images that are to be processed by the processing device and the processing load can be reduced.

A seventh aspect is a non-transitory recording medium storing a program that is executable by a computer to perform processing including receiver processing, calculation processing, and image processing. The receiver processing receives, from a vehicle, image information according to a captured image captured by an image capture device provided at the vehicle. The calculation processing calculates a degree of similarity between a captured image according to newly received image information, and a reference image according to image information that has already been received. The image processing identifies an obstacle with respect to a captured image having a degree of similarity that is lower than a threshold value.

The program recorded on the non-transitory recording medium of the seventh aspect includes processing such that image information is received from a plurality of vehicles in a computer, the degree of similarity of captured images is calculated, and image processing is executed with respect to a captured image having a lower degree of similarity than a threshold value. As described above, the degree of similarity of the captured image is calculated as a value with respect to a reference image that has already been received. The program treats a captured image having a degree of similarity that is equal to or higher than a threshold value as an image that is similar to the reference image, and controls the computer so that image processing is not executed. As a result, when performing image processing to identify an obstacle based on images captured at a vehicle, it is possible to reduce the number of captured images that are to be processed by the computer that performs the image processing and the processing, load can be reduced.

According to the present disclosure, when performing image processing to identify an obstacle based on images captured at a vehicle, it is possible to reduce the number of captured images that are to be processed by the processing-side device and the processing load can be reduced.

BRIEF DESCRIPTION OF THE DRAWINGS

Exemplary embodiments of the present disclosure will be described in detail based on the following figures, wherein.

DETAILED DESCRIPTION

First Embodiment

Figure 1:
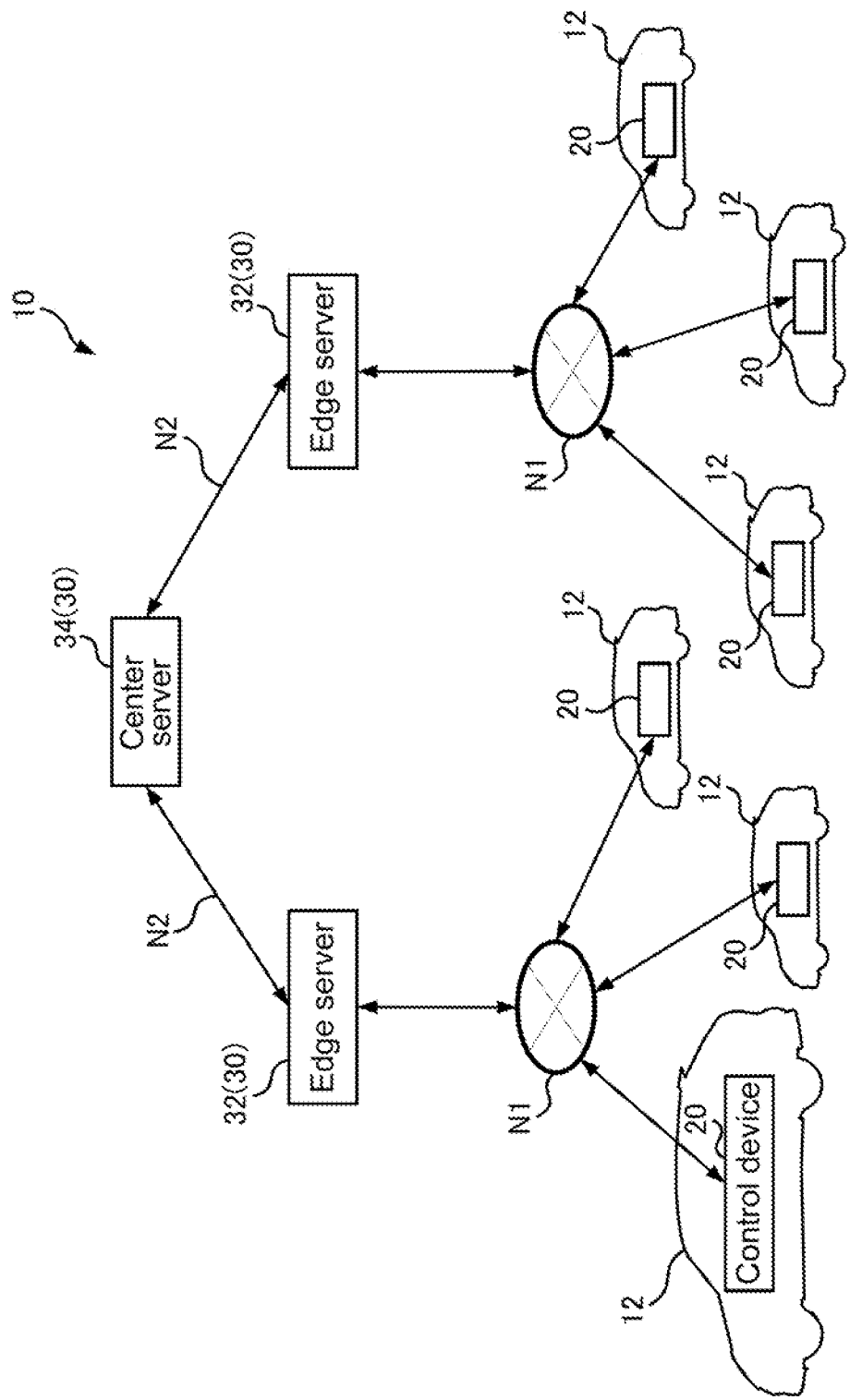
FIG. 1 is a diagram illustrating a schematic configuration of an age processing system according to a first embodiment.

As shown in FIG. 1, the image processing system 10 of the present embodiment is configured to include a plurality of vehicles 12 and a plurality of servers 30. A control device 20 is mounted on each vehicle 12. The server 30 includes an edge server 32 as a relay device and a center server 34 as a processing device. The edge server 32 has a function of relaying communication between the control device 20 and the center server 34.

Figure 2:
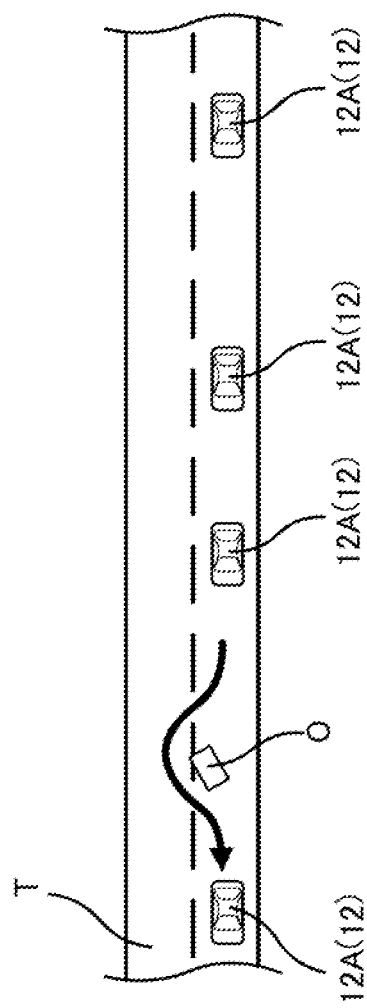
FIG. 2 is a diagram illustrating a passing vehicle that passes an obstacle.
Figure 12:
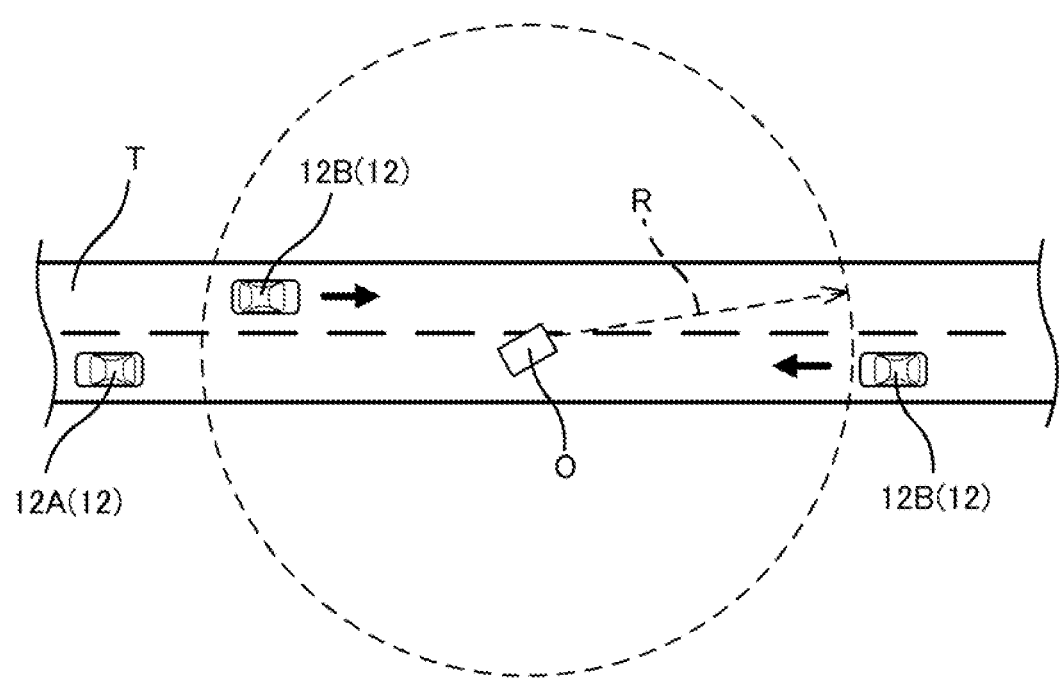
FIG. 12 is a diagram illustrating a state in which the notification process is executed.

As shown in FIG. 2, the plurality of vehicles 12 includes a passing vehicle 12A that travels on the traveling path T and a peripheral vehicle 12B that travels in the periphery of the passing vehicle 12A and is referred to in FIG. 12. Here, the passing vehicle 12A is a vehicle 12 that passes the obstacle O before the nature of the obstacle O is identified, and the peripheral vehicle 12B is a vehicle 12 that approaches the obstacle O after the obstacle O is identified.

In the present embodiment, the passing vehicle 12A corresponds to the "vehicle" of the present disclosure, and the peripheral vehicle 12B corresponds to the "other vehicle" of the present disclosure. The peripheral vehicle 12B is not limited to a following vehicle that travels in the same lane as the passing vehicle 12A on the traveling road T, but also includes an oncoming vehicle that travels in the oncoming lane and a vehicle that travels on another traveling road connected to the traveling road T.

The control device 20 of each vehicle 12 and the edge server 32 are connected to each other via a network N1. The edge server 32 and the center server 34 are connected to each other via a network N2.

In the image processing system 10 of FIG. 1, two edge servers 32 are connected to one center server 34, and three vehicles 12 are connected to each edge server 32. However, it is not limited to this. That is, one or more edge servers 32 can be connected to one center server 34, and one or more vehicles 12 (specifically, control devices 20) can be connected to each edge server 32.

(Vehicle)

Figure 3:
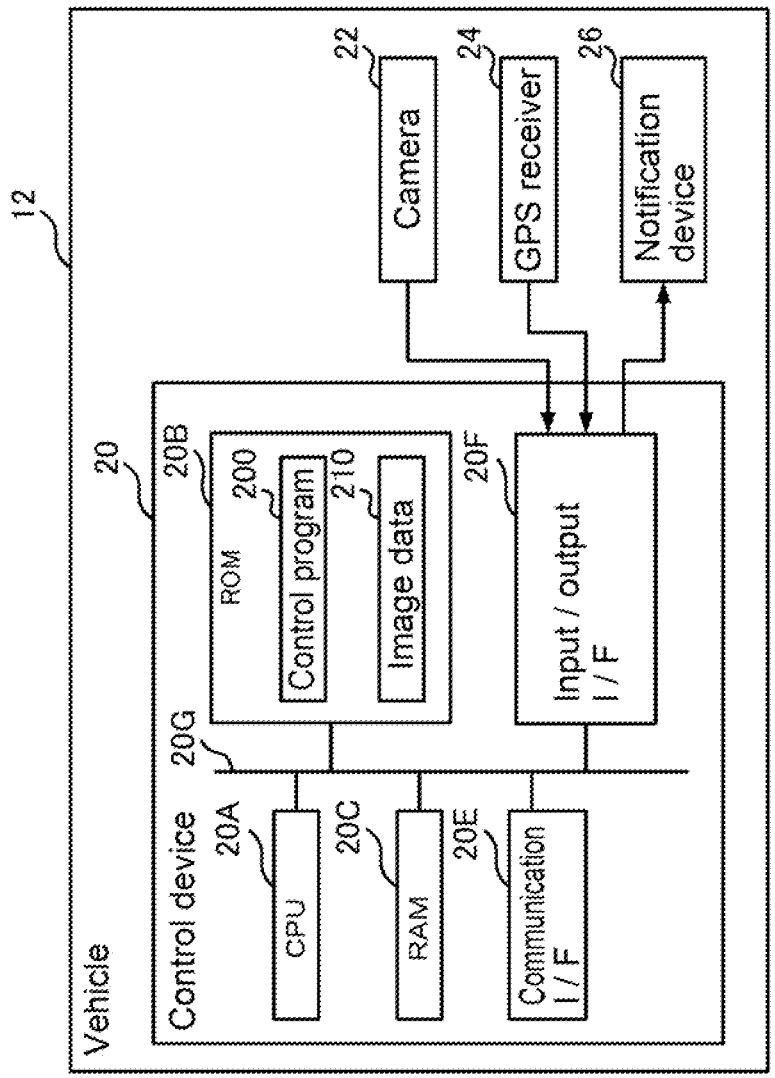
FIG. 3 is a block diagram illustrating a hardware configuration of a vehicle according to the first embodiment.

As shown in FIG. 3, the vehicle 12 according to the present embodiment includes a control device 20, a camera 22 as an imaging device, a GPS receiver 24, and a notification device 26. GPS stands for Global Positioning System.

The control device 20 is configured to include a CPU 20A, a ROM 20B, a RAM 20C, a communication I/F 20E, and an input/output I/F 20F. The CPU 20A, the ROM 20B, the RAM 20C, the communication I/F 20E, and the input/output I/F 20F are connected so as to be capable of communicating with each other through a bus 20G. CPU means Central Processing Unit, ROM means Read Only Memory, RAM means Random Access Memory, and I/F means interface.

The CPU 20A is a central computation processing unit that executes various programs and controls the respective units. Namely, the CPU 20A reads a program from the ROM 20B, and executes the program employing the RAM 20C as a workspace. The CPU 20A is an example of a first processor.

The ROM 20B stores various programs and various data. A control program 200 and image data 210 are stored in the ROM 20B of this embodiment. The control program 200 is a program for performing the image provision processing described below. The image data 210 stores image information regarding a captured image captured by the camera 22. The image data 210 may be stored in an SD card, a USB memory, or the like, connected to the control device 20. SD stands for Secure Digital and USB stands for Universal Serial Bus.

The RAM 20C serves as a workspace for temporary storage of programs and data.

The communication I/F 20E is an interface for connecting to the network N1 to communicate with the edge server 32. For communication with the edge server 32, a communication standard such as 5G, LTE, or Wi-Fi (registered trademark) is used, for example.

The input/output I/F 20F is an interface for communicating with the camera 22, the GPS receiver 24, and the notification device 26 mounted on the vehicle 12.

The camera 22 is fixed to the upper part of the front window of the vehicle 12, for example, and captures images to the front of the vehicle 12. Note that the camera 22 may not only capture images to the front of the vehicle 12 but may also capture images to be rear of the vehicle 12 and of the interior of the vehicle cabin.

The GPS receiver 24 receives GPS signals from plural GPS satellites, and measures the current position of the vehicle 12.

The notification device 26 is a device that is provided in the cabin of the vehicle 12 and that notifies the driver of information regarding the obstacle O. The notification device 26 may be a meter unit, a car navigation system, or an independent device.

Figure 4:
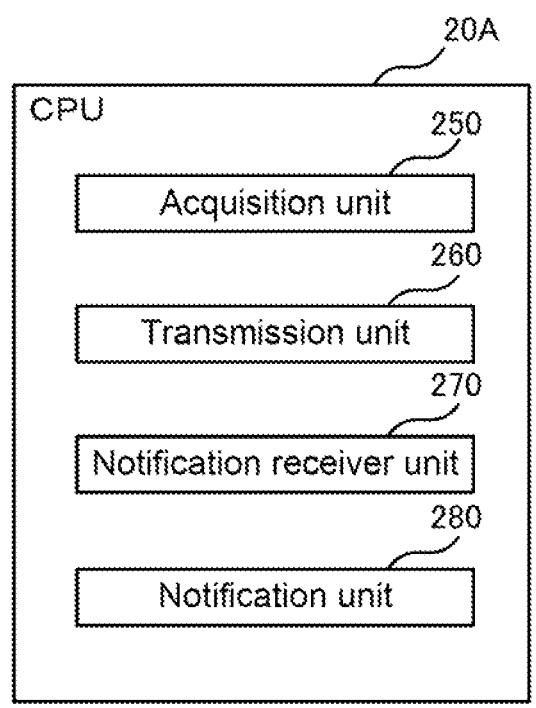
FIG. 4 is a block diagram illustrating an example of a functional configuration of a CPU in a control device of the first embodiment.

FIG. 4 is a block diagram illustrating an example of the functional configuration of the control device 20. Each functional configuration is realized by the CPU 20A reading and executing the control program 200 stored in the ROM 20B. The CPU 20A of the present embodiment functions as the acquisition unit 250, the transmission unit 260, the notification receiver unit 270, and the notification unit 280 by executing the control program 200.

The acquisition unit 250 has a function of acquiring image information regarding a captured image captured by the camera 22, position information of the vehicle 12 detected by the GPS receiver 24, the current time, and the like. When the camera 22 images the obstacle O on the traveling path T, the acquisition unit 250 acquires image information triggered by an imaging instruction from the driver, position information, and information such as the current time. The imaging instruction corresponds, for example, to operation of a switch for imaging. In this embodiment, the position information of the passing vehicle 12A corresponds to the "first position information" of the present disclosure, and the position information of the surrounding vehicle 12B corresponds to the "second position information" of the present disclosure. The captured image acquired in the present embodiment may be a moving image or a still image.

The transmission unit 260 has a function of transmitting the image information acquired by the acquisition unit 250 to the edge server 32. Here, attachment information corresponding to the image information is added to the image information transmitted by the transmission unit 260. The additional information includes the position information of the vehicle 12 when the captured image was captured, the information of the traveling road T, the traveling direction, and the traveling time.

The notification receiving unit 270 has a function of receiving danger information (described below) transmitted from the center server 34. The danger information is notified from the center server 34 via the edge server 32 when the vehicle 12 is the surrounding vehicle 12B and approaches the obstacle O specified based on the captured image captured by the passing vehicle 12A.

The notification unit 280 has a function of notifying the driver that the obstacle O is approaching, based on the danger information received from the center server 34. The notification unit 280 operates the notification device 26 at the timing when the danger information is received.

(Server)

Figure 5:
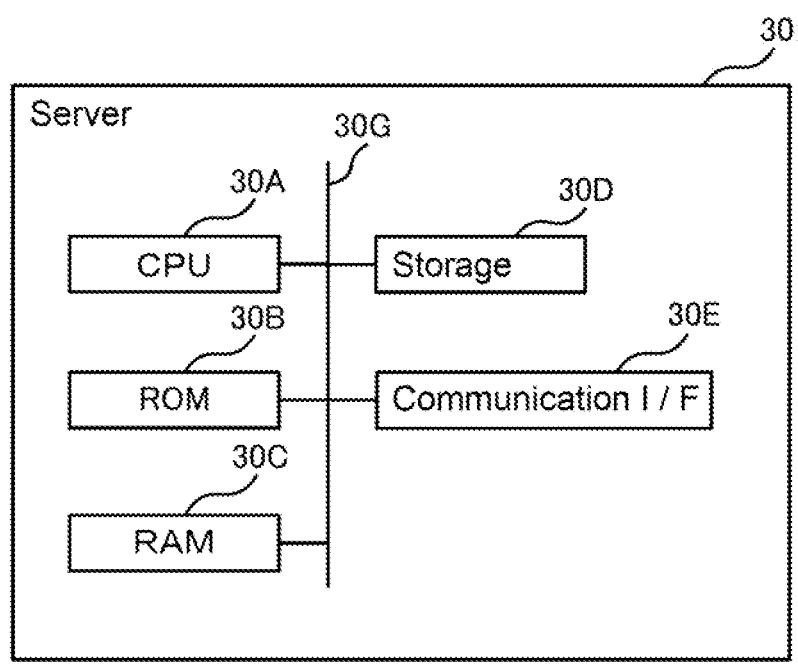
FIG. 5 is a block diagram illustrating a hardware configuration of a server of the first embodiment.

As illustrated in FIG. 5, the server 30 is configured including a CPU 30A, ROM 30B, RAM 30C, storage 30D, and a communication I/F 30E. The CPU 30A, ROM 30B, RAM 30C, storage 30D, and communication I/F 30E are connected so as to be capable of communicating with each other through a bus 30G. The functions of the CPU 30A, ROM 30B, and RAM 30C are the same as those of the CPU 20A, ROM 20B, and RAM 20C of the control device 20 described above.

The storage 30D is configured by a Hard Disk Drive or a Solid State Drive and stores various programs and various data.

The communication I/F 30E is an interface for communicating with the control device 20 and another server 30. The communication I/F 30E of the edge server 32 is an interface connectable to both the network N1 and the network N2. The network N2 may be a dedicated line or a line based on a communication standard such as 5G or LTE. The communication I/F 30E of the center server 34 is an interface connectable to at least the network N2.

The CPU 30A reads a program from the storage 30D and executes the program using the RAM 30C as a work area. In the CPU 30A of the present embodiment, different functions are realized in the edge server 32 and in the center server 34.

(Edge Server)

Figure 6A:
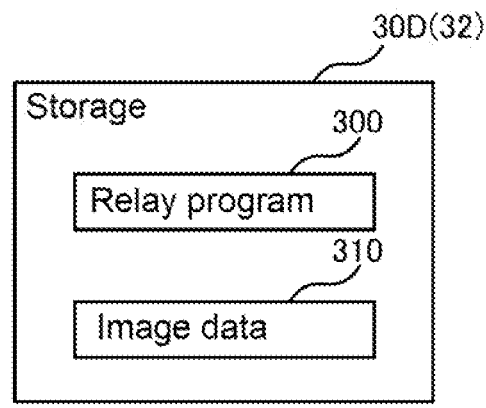
FIG. 6A is a block diagram showing an example of data stored in a storage, which is an edge server of the first embodiment.
Figure 6B:
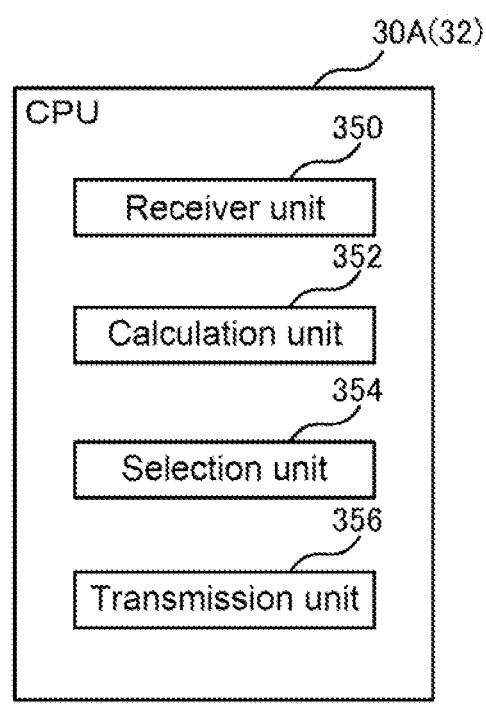
FIG. 6B is a block diagram showing an example of a functional configuration of a CPU, which is the edge server of the first embodiment.

As shown in FIG. 6A, the edge server 32 of this embodiment stores a relay program 300 and image data 310 in a storage 30D. The relay program 300 is a program for performing the image selection processing described below. By executing the relay program 300, the CPU 30A of the edge server 32 functions as a receiver unit 350, a calculation unit 352, a selection unit 354, and a transmission unit 356 illustrated in FIG. 6B. The CPU 30A of the edge server 32 server of this embodiment is an example of a second processor.

The receiver unit 350 has a function of receiving the image information to which the attached information is added, which is transmitted from the plural control devices 20.

The calculation unit 352 has a function of calculating the degree of similarity between the captured image related to the newly received image information, and a reference image related to image information that has already been received. The image information regarding the reference image is stored in the image data 310 in the storage 30D. The reference image is the first image captured among the captured images acquired from the passing vehicle 12A at the capturing location of the captured image. Here, a known method is used to calculate the degree of similarity. For example, the feature points of the captured image and the feature points of the reference image can be respectively extracted, and the degree of similarity can be calculated from the degree of matching between the respective feature points.

The selectin unit 354 has a function of comparing the similarity degree calculated by the calculation unit 352 with a preset threshold value and selecting a captured image to be transmitted to the center server 34. Specifically, the selection unit 354 selects the image information related to a degree of similarity lower than the threshold value as "information to be transmitted to the center server 34" and provides the transmission unit 356 with the selected image information. Further, the selection unit. 354 selects the image information related to a degree of similarity equal to or higher than the threshold as "information to be discarded" and deletes this from the RAM 30C. Furthermore, when a reference image is newly set, the selection unit 354 stores the reference image in the image data 310.

The transmission unit 356 has a function of transmitting the image information selected by the selection unit 354 to the center server 34. Attachment information corresponding to the image information is added to the image information transmitted by the transmission unit 356.

(Center Server)

Figure 7A:
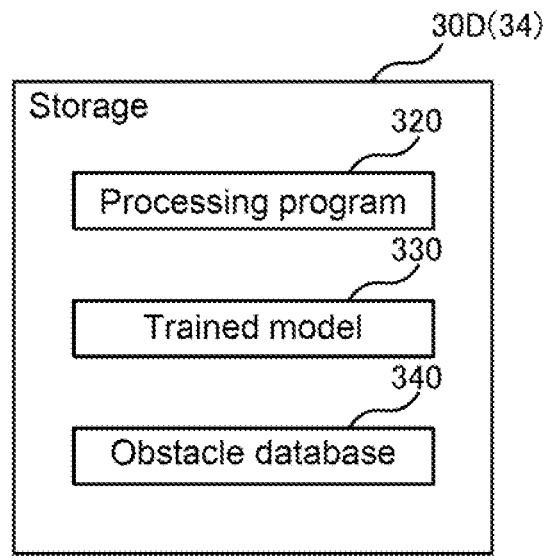
FIG. 7A is a block diagram showing an example of data stored in a storage, which is a center server of the first embodiment.
Figure 7B:
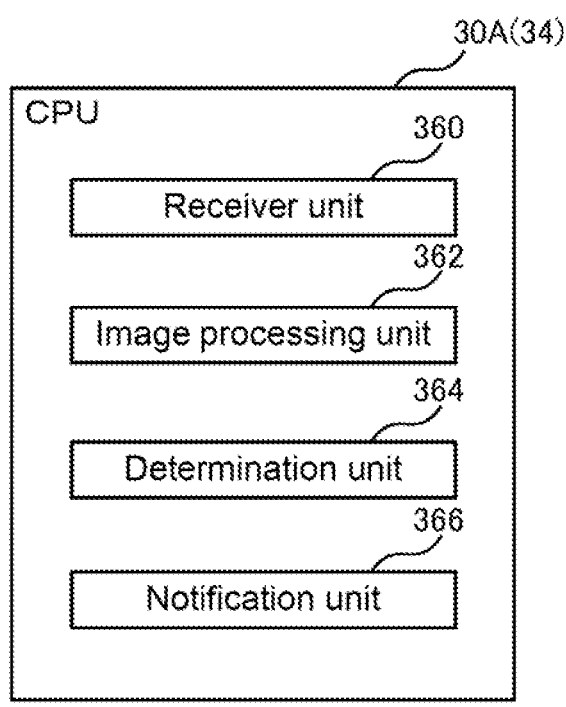
FIG. 7B is a block diagram showing an example of a functional configuration of a CPU, which is the center server of the first embodiment.

As shown in FIG. 7A, the center server 34 of this embodiment stores a processing program 320, a learned model 330, and an obstacle database 340 in the storage 30D. The processing program 320 is a program for performing the information processing and notification processing described below. By executing the processing program 320, the CPU 30A of the center server 34 functions as the receiver unit 360, the image processing unit 362, the determination unit 364, and the notification unit 366 shown in FIG. 7B. The CPU 30A of the center server 34 of this embodiment is an example of a third processor.

The receiving unit 360 has a function of receiving the image information to which the attached information is added, which is transmitted from one or more edge servers 32.

The image processing unit 362, as a processing unit, has a function of performing image processing of identifying the obstacle O with respect to a captured image having a similarity degree lower than the threshold value. The image processing is executed by inputting image information to the learned model 330 that has performed machine-learning using previously known obstacles as teacher data. When it is possible to identify what the obstacle O is as a result of the image processing, information on the shape and size of the obstacle O, position information, and the like are stored as obstacle information in the obstacle database 340.

The determination unit 364 has a function of determining whether the surrounding vehicle 12B has approached the obstacle O. The determination unit 364 determines from the position information given to the obstacle O that the vehicle 12B has approached the obstacle O when the surrounding vehicle 12B is present at a predetermined distance. The predetermined distance is within the range of the distance R referred to in FIG. 12, for example.

The notification unit 366 has a function of notifying the surrounding vehicle 12B of the danger information. When the determination unit 364 determines that the obstacle O has been approached, the notification unit 366 of the present embodiment notifies the surrounding vehicle 12B of the danger information. That is, the center server 34 transmits the danger information to the control device 20 of the peripheral vehicle 12B via the edge server 32.

(Control Flow)

An example of the flow of processing executed in the image processing: system 10 of this embodiment will be described with reference to the flowcharts of FIGS. 8 to 11.

First, when the obstacle O has fallen on the traveling path T, the flow of the image provision processing executed in the control device 20 of the passing vehicle 12A that has passed by avoiding the obstacle O is as follows.

Figure 8:
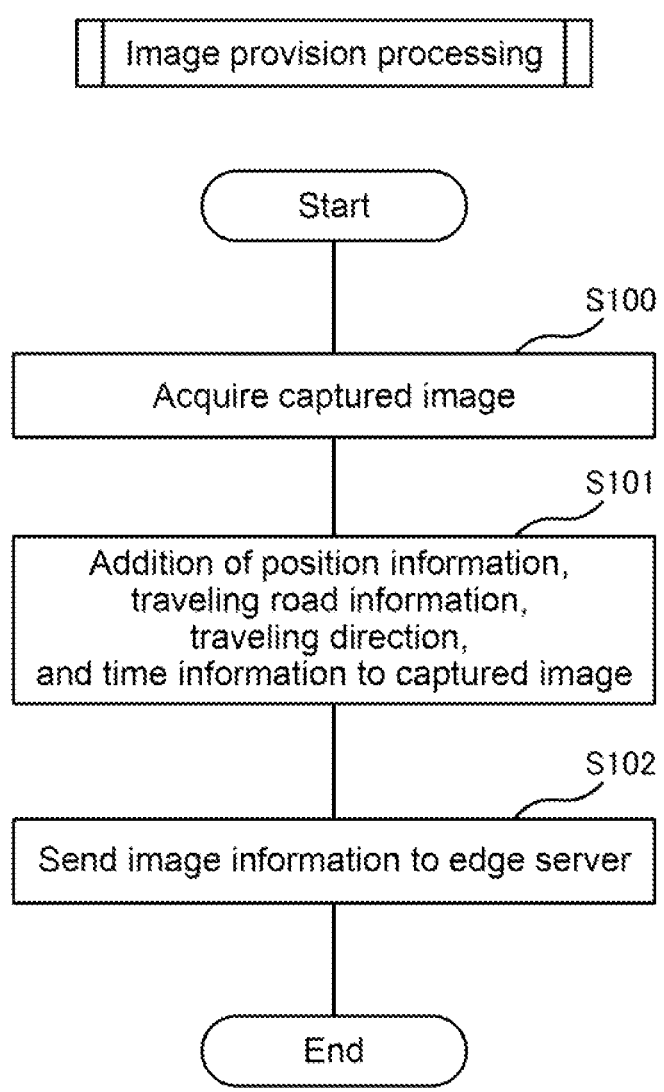
FIG. 8 is a flowchart showing the flow of image provision processing executed in the control device of the first embodiment.

In step S100 of FIG. 8, the CPU 20A acquires a captured image from the camera 22.

In step S101, the CPU 20A adds to the captured image, as additional information, the position information of the vehicle 12, specifically, of the passing vehicle 12A, the information on the traveling road T, the traveling direction, and the traveling time.

In step S102, the CPU 20A transmits the image information with the attached information to the edge server 32. Then, the image providing process ends.

Next, the flow of the image selection processing executed in the edge server 32 is as follows.

Figure 9:
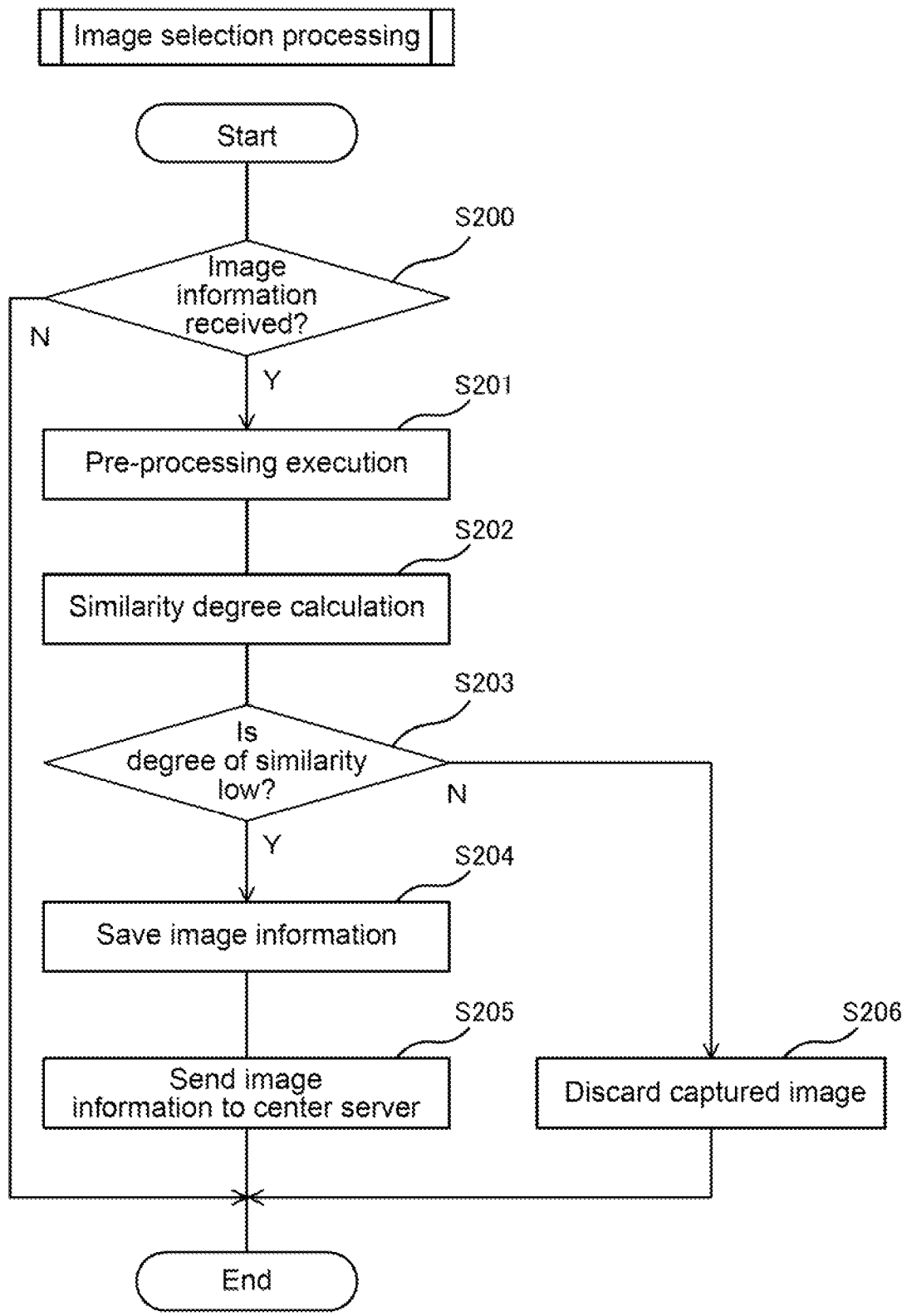
FIG. 9 is a flowchart showing a flow of image selection processing executed in the edge server of the first embodiment.

In step S200 of FIG. 9, the CPU 30A determines whether or not image information has been received from the control device 20. When the CPU 30A determines that the image information has been received, the processing proceeds to step S201. On the other hand, when the CPU 30A determines that the image information has not been received, the CPU 30A ends the image selection process.

In step S201, the CPU 30A performs preprocessing on the captured image whose degree of similarity is to be calculated. Specifically, the CPU 30A performs area division and edge detection on the captured image.

In step S202, the CPU 30A calculates the degree of similarity, with respect to the reference image, for the captured image that has undergone the preprocessing.

In step S203, the CPU 30A determines whether or not the degree of similarity is low. Specifically, it is determined whether or not the calculated degree of similarity is below a preset threshold. In addition, when there is no reference image to be compared, that is, even for the first captured image of the obstacle O, the CPU 30A determines that the degree of similarity is low. When the CPU 30A determines that the degree of similarity is low, that is, when the degree of similarity is lower than the threshold value, the process proceeds to step S204. On the other hand, if the CPU 30A determines that the degree of similarity is not low, that is, if the degree of similarity is greater than or equal to the threshold value, the process proceeds to step S206.

In step S204, the CPU 30A stores, in the image data 310, image information related to the captured image that has a low degree of similarity. Here, if the captured image is the first image of the obstacle O captured, the captured image is stored in the image data 310 as a reference image.

In step S205, the CPU 30A transmits image information regarding the captured image, which has been determined to have a low degree of similarity, to the center server 34. Then, the image selecting process ends.

In step S206, the CPU 30A discards the captured image regarding which it has been determined that the degree of similarity is not low. That is, the CPU 30A erases the image information relating to the captured image from the RAM 20C without storing it in the image data 310. Then, the image selecting process ends.

The image selection processing executed by the edge server 32 ends when the obstacle information is received from the center server 34. This is because it is not necessary to select the captured image to be transmitted to the center server 34 in order to perform the image processing, because the obstacle O has been identified.

Next, the flow of the information processing executed in the center server 34 is as follows.

Figure 10:
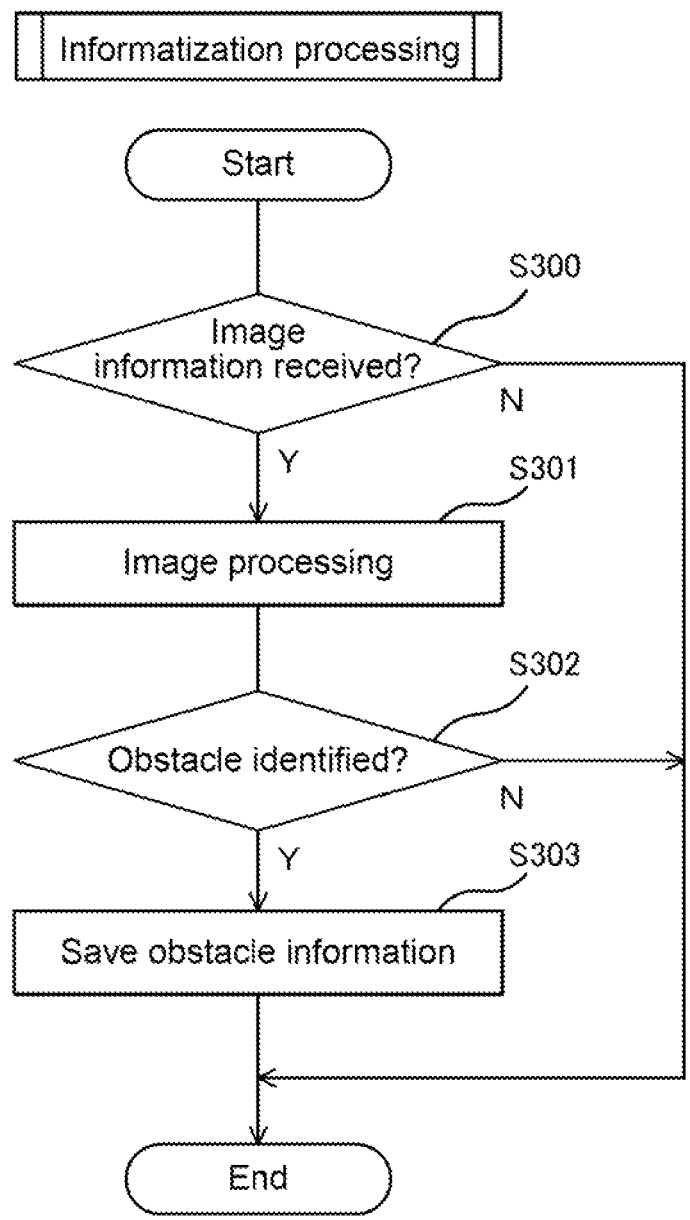
FIG. 10 is a flowchart showing the flow of computerization processing executed in the center server of the first embodiment.

In step S300 of FIG. 10, the CPU 30A determines whether or not image information has been received from the edge server 32. When the CPU 30A determines that the image information has been received, the processing proceeds to step S301. On the other hand, when the CPU 30A determines that the image information has not been received, the CPU 30A ends the information processing.

In step S301, the CPU 30A executes image processing. That is, the CPU 30A inputs the image information to the learned model 330 and tries to identify the obstacle O.

In step S302, the CPU 30A determines whether or not the obstacle O has been identified. When the CPU 30A determines that the obstacle O has been specified, the processing proceeds to step S303. On the other hand, when the CPU 30A determines that the obstacle O has not been specified, the CPU 30A ends the information processing.

In step S303, the CPU 30A stores the obstacle information. Specifically, the CPU 30A stores, as the obstacle information, information on the type and size of the identified obstacle O and position information in the obstacle database 340. Then, the information processing ends.

On the other hand, the flow of the notification processing executed in the center server 34 after the obstacle O has been specified is as follows.

Figure 11:
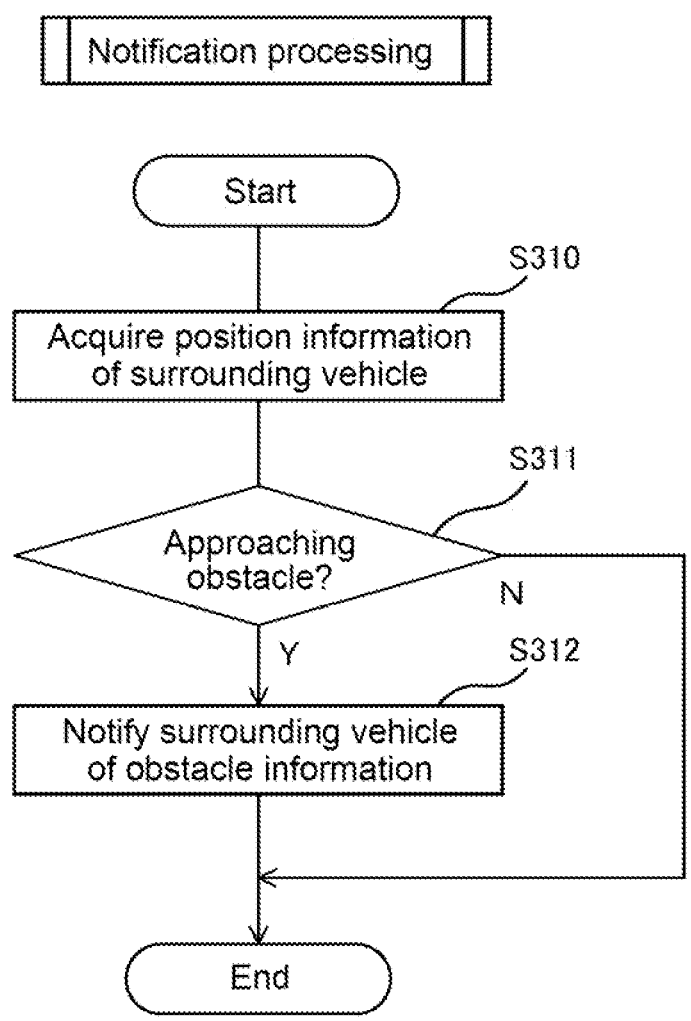
FIG. 11 is a flowchart showing the flow of notification processing executed in, the center server of the first embodiment.

In step S310 of FIG. 11, the CPU 30A acquires the position information of the surrounding vehicle 12B.

In step S311, CPU 30A determines whether or not peripheral vehicle 12B has approached Obstacle O. For example, as shown in FIG. 12, when there is an obstacle O on the traveling path T, such as lumber, a cardboard box, or a container box, which may interfere with the traveling of the vehicle 12, a determination is made as to whether or not there is a peripheral vehicle 12B that has entered within the range of a distance R from the Obstacle O. When the CPU 30A determines that the surrounding vehicle 12B has approached the obstacle O, the processing proceeds to step S312 in FIG. 11. On the other hand, when the CPU 30A determines that the surrounding vehicle 12B has not approached the obstacle O, the CPU 30A ends the notification processing.

In step S312, the CPU 30A notifies the surrounding vehicle 12B that has approached the obstacle O of the obstacle information as the danger information. The notification processing is then ended. Although the center server 34 of the present embodiment transmits the obstacle information to the control device 20 of the peripheral vehicle 12B via the edge server 32, the obstacle information may be transmitted to the control device 20 directly without passing through the edge server 32.

Through the above notification processing, the peripheral vehicle 12B that has received the obstacle information alerts the driver to the obstacle O.

(Summary)

The image processing system 10 of the present embodiment includes a control device 20 mounted on the vehicle 12, a center server 34 that executes image processing, and an edge server 32 that relays between the control device 20 and the center server 34. In the present embodiment, when the passing vehicle 12A images the obstacle O on the traveling path T, the edge server 32 receives image information from the control devices 20 of plural passing vehicles 12A, and the calculating unit 352 of the edge server 32 calculates the degree of similarity of the captured images. Then in the center server 34, the image processing unit 362 performs the image processing on a captured image having a lower degree of similarity than the threshold, to identify the obstacle O.

Here, the degree of similarity of the captured image is calculated as a value with respect to the reference image. Then, the edge server 32 is configured so that a captured image having a degree of similarity that is equal to or higher than a threshold is treated as an image that is similar to the reference image and is not transmitted to the center server 34. That is, the image similar to the reference image is not received by the center server 34, and the image processing is not executed.

As described above, according to the present embodiment, when the image processing for identifying the obstacle O is performed based on the image captured by the vehicle 12, the captured images to be processed by the center server 34 can be reduced, and the processing load can be reduced.

Further, according to the present embodiment, since the edge server 32 selects the captured image to be transmitted to the center server 34 based on the degree of similarity, the amount of communication in the network N2 between the edge server 32 and the center server 34 can be reduced.

Further, according to the present embodiment, since an image that is determined to be similar to the reference image in the edge server 32 is discarded and is not stored in the storage 30D, the resource consumption of the edge server 32 can be suppressed.

Furthermore, according to the present embodiment, it is possible to call the attention of the peripheral vehicle 12B to the obstacle O on the traveling path T based on the position information of the obstacle O.

Second Embodiment

In the first embodiment, the edge server 32 is configured to execute the image selection processing, but in the second embodiment, the edge server 32 is eliminated and the center server 34 can execute the image selection processing. Explanation follows regarding the points that differ from the first exemplary embodiment. Configurations corresponding to those of the first exemplary embodiment are allocated the same reference numerals, and explanation thereof is omitted.

The image processing system 10 of the present embodiment includes a plurality of vehicles 12, a control device 20 mounted on each vehicle 12, and a center server 34.

Figure 13:
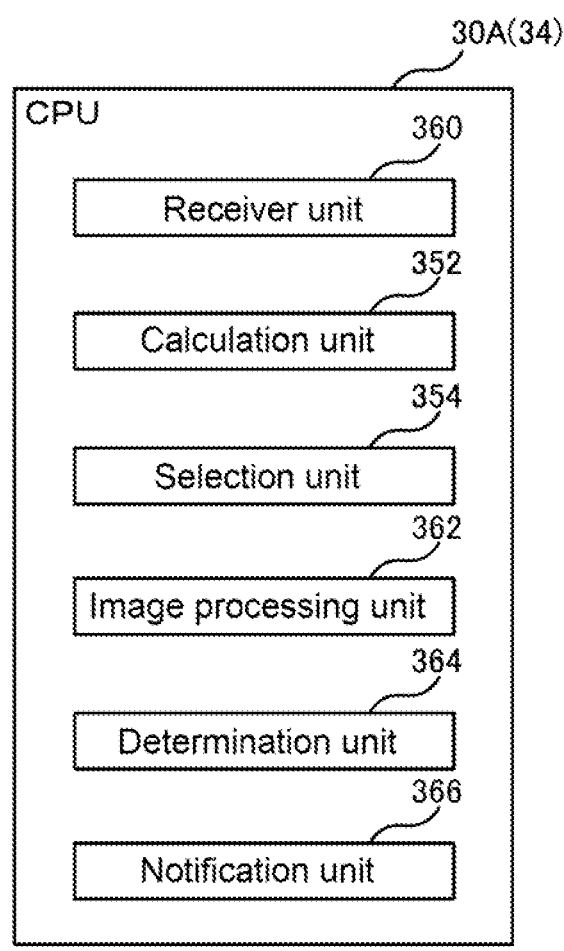
FIG. 13 is a block diagram showing an example of a functional configuration of a CPU, which is a center server of a second embodiment.

FIG. 13 is a block diagram showing an example of the functional configuration of the center server 34 of this embodiment. As shown in FIG. 13, the CPU 30A has a receiver unit 360, a calculation unit 352, a selection unit 354, an image processing unit 362, a determination unit 364, and a notification unit 366. Each functional configuration is realized by reading the processing program 320 from the storage 30D and executing it. The CPU 30A of the center server 34 of this embodiment is an example of a second processor.

In the center server 34 of the present embodiment, when the image information is received from the control device 20, the image selection processing is executed first, and then the information processing is executed. Then, after the obstacle O is specified, the notification processing is executed.

In the present embodiment, similarly to the first embodiment, when the image processing for identifying the obstacle O is performed based on the image captured by the vehicle 12, the captured images to be processed by the center server 34 can be reduced, and the processing load can be reduced.

In each of the above-described embodiments, among the captured images acquired from the passing vehicle 12A, the image captured first at the capturing location of the captured images is used as the reference image, hut the present disclosure is not limited to this. For example, the calculation unit 352 may use, as the reference image, the captured image with the highest image quality among the images captured by the camera 22 of the passing vehicle 12A. Further, for example, the captured image captured by the camera 22 having the highest resolution among the respective passing vehicles 12A may be used as the reference image.

Further, when the calculation unit 352 receives a captured image having a higher image quality than the reference image to be compared when calculating the degree of similarity, the calculation unit 352 may update the captured image as a new reference image.

It should be noted that various processors other than a CPU may execute the various processes executed by the CPUs 20A and 30A by reading the software including the program in each of the above embodiments. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC) or the like. Moreover, the above-described receiver processing may be executed by one of such processors, or may be executed by a combination of two or more processors of the same type or different types (for example, plural FPGAs, or a combination of a CPU and an FPGA). More specific examples of hardware structures of such processors include electric circuits configured by combining circuit elements, such as semiconductor devices.

In each of the exemplary embodiments described above, explanation has been given in which the respective programs are provided in a format pre-stored or installed on a non-transitory computer-readable recording medium. For example, in the control device 20, the control program 200 is stored in the ROM 20B in advance. Further, example, the relay program 300 in the edge server 32 and the processing program 320 in the center server 34 are stored in advance in the storage 30D of each server 30. However, there is no limitation thereof, and the respective programs may be provided in a format stored on a non-transitory recording medium such as Compact Disc Read Only Memory (CD-ROM), Digital Versatile Disc Read Only Memory (DVD-ROM), or Universal Serial Bus (USB) memory. The programs may alternatively be provided in a format that can be downloaded from an external device through a network.

The processing flows described in the above exemplary embodiment are merely examples thereof, and unnecessary steps may be omitted, new steps added, or the processing sequence changed within a range not departing from the spirit thereof.

What is claimed is:

1. An image processing system, comprising:
an image capture device provided in a vehicle;
a control device installed in the vehicle and including a first processor configured to transmit first image information including information on a captured image captured by the image capture device; and
a processing server, located elsewhere than the vehicle, configured to perform image processing, and including a second processor configured to:
  receive a plurality of pieces of the first image information transmitted from respective ones of the control devices, which are respectively provided in a plurality of the vehicles,
  calculate a degree of similarity of respective images captured by respective ones of the capture devices provided in the plurality of the vehicles by comparing relatively more recently received information of the plurality of pieces of the first image information with relatively less recently received information of the plurality of pieces of the first image information, the relatively less recently received information including information on a reference image, and
  perform image processing to identify an obstacle present in at least one of the respective images captured by the respective ones of the capture devices provided in the plurality of the vehicles, the at least one of respective images having a degree of similarity that is lower than a threshold value with respect to the reference image.

2. The image processing system recited in claim 1, wherein the second processor of the processing server is further configured to:
  receive, together with the plurality of pieces of the first image information, a plurality of respective pieces of position information respectively corresponding to a plurality of the respective images captured by the respective ones of the capture devices provided in the plurality of the vehicles,
  determine whether or not a first vehicle of the plurality of vehicles has approached the obstacle based on at least one piece of the plurality of respective pieces of the position information which does not correspond to an image captured by a respective image capture device provided in the first vehicle, and
  upon a determination that the first vehicle is approaching the obstacle, notify the first vehicle by providing danger information related to the obstacle.

3. The image processing system recited in claim 1, wherein the second processor of the processing server is configured to perform the image processing using machine learning.

4. An image processing system, comprising:
  an image capture device provided in a vehicle;
  a control device installed in the vehicle and including a first processor configured to transmit first image information including information on a captured image captured by the image capture device;
  a processing server, located elsewhere than the vehicle, and configured to perform image processing; and
  a relay server, located elsewhere than the vehicle, being connected to the control device and the processing server, and including a second processor configured to:
    receive a plurality of pieces of the first image information transmitted from respective ones of the control devices, which are respectively provided in a plurality of the vehicles,
    calculate a degree of similarity of respective captured images captured by respective ones of the capture devices provided in the plurality of the vehicles by comparing relatively more recently received information of the plurality of pieces of the first image information with relatively less recently received information of the plurality of pieces of the first image information, the relatively less recently received information including information on a reference image, and
    upon a determination that a degree of similarity of the respective captured images is lower than a threshold value, transmit second image information to the processing server for image processing;
wherein
  the processing server includes a third processor configured to receive the second image information transmitted from the relay server and perform image processing to identify an obstacle present in at least one of the respective images captured by the respective ones of the capture devices provided in the plurality of the vehicles, the at least one of respective images having a lower degree of similarity than the threshold value with respect to the reference image.

5. The image processing system recited in claim 4, wherein the third processor of the processing server is further configured to:
  receive, together with the plurality of the first image information, a plurality of respective pieces of position information respectively corresponding to a plurality of the respective images captured by the respective ones of the capture devices provided in the plurality of the vehicles,
  determine whether or not a first vehicle of the plurality of vehicles has approached the obstacle based on at least one piece of the plurality of respective pieces of the position information which does not correspond to an image captured by a respective image capture device provided in the first vehicle, and
  upon a determination that the first vehicle is approaching the obstacle, notify the first vehicle by providing danger information related to the obstacle.

6. The image processing system recited in claim 4, wherein the second processor of the relay server is further configured to discard respective ones of the captured images upon a determination that the respective ones of the captured images have respective degrees of similarity that are equal to or higher than the threshold value.

7. The image processing system recited in claim 4, wherein, the second processor of the relay server is further configured to replace the reference image by a more recently captured image of the respectively captured image captured by the respective ones of the capture devices upon a determination that the more recently capture image has a higher image quality than the reference image.

8. The image processing system recited in claim 4, wherein the third processor of the processing server is configured to perform the image processing using machine learning.

9. A processing server located elsewhere from a vehicle, and comprising a processor, the processor being configured to:
  receive, from the vehicle, first image information including information on images captured by an image capture device provided in the vehicle,
  calculate a degree of similarity between respective ones of the first image information, the respective ones of the first image information being received at different times, and
  perform image processing on ones of the first image information that have a relatively lower degree of similarity, the relatively lower degree of similarity being lower than a threshold value, the image processing being for identification of an obstacle.

10. A relay device located elsewhere from a vehicle and comprising a processor, the processor being configured to:
  receive, from the vehicle, first image information including information on images captured by an image capture device provided in the vehicle,
  calculate a degree of similarity between respective ones of the first image information, the respective ones of the first image information being received at different times, and
  transmit, to a processing server for image processing located elsewhere from the vehicle, ones of the first image information that have a relatively lower degree of similarity, the relatively lower degree of similarity being lower than a threshold value, the image processing being for identification of an obstacle.

11. A non-transitory recording medium stored elsewhere from a vehicle and storing a program that is executable by a computer, the program including instructions that, when executed by the computer cause one or more processor of the computer to perform:
  receiver processing to receive, from a vehicle, first image information including information on images captured by an image capture device provided in the vehicle;
  calculation processing to calculate a degree of similarity between respective ones of the first image information, the respective ones of the first image information being received at different times; and
  image processing on ones of the first image information that have a relatively lower degree of similarity, the relatively lower degree of similarity being lower than a threshold value, the image processing being for identification of an obstacle.

* * * * *